(12) United States Patent
Chiang (10) Patent No.: US 7,294,011 B1
(45) Date of Patent: Nov. 13, 2007

(54) ELECTRONIC DEVICE RETENTION APPARATUS

(75) Inventor: Lin-Hsu Chiang, Taipei (TW)

(73) Assignee: ASUSTeK Computer, Inc., Taipei (TW)

( * ) Notice: Subject to any disclaimer, the term of this patent is extended or adjusted under 35 U.S.C. 154(b) by 0 days.

(21) Appl. No.: 11/785,381

(22) Filed: Apr. 17, 2007

(30) Foreign Application Priority Data

Apr. 25, 2006   (TW) ................ 95114780 A (51) Int. Cl.
  *H01R 13/64* (2006.01)
(52) U.S. Cl. .................. 439/377; 361/727; 361/685
(58) Field of Classification Search ................ 439/297, 439/374, 377; 361/727, 685
  See application file for complete search history.

(56) References Cited

U.S. PATENT DOCUMENTS

| | | | |
|---|---|---|---|
| 5,332,306 A | * | 7/1994 | Babb et al. ............ 312/334.16 |
| 5,595,501 A | * | 1/1997 | Ho .............................. 439/377 |
| 6,370,022 B1 | * | 4/2002 | Hooper et al. .............. 361/685 |
| 6,373,695 B1 | * | 4/2002 | Cheng ........................ 361/685 |
| 6,377,449 B1 | * | 4/2002 | Liao et al. .................. 361/685 |
| 6,654,240 B1 | * | 11/2003 | Tseng et al. ................ 361/685 |

* cited by examiner

*Primary Examiner*—Tho D. Ta
(74) *Attorney, Agent, or Firm*—Birch, Stewart, Kolasch & Birch, LLP (57) ABSTRACT

An electronic device retention apparatus for fixing an electronic device with a first mounting hole and a second mounting hole includes a fixed case, a mounting piece, and a flexible structure. The fixed case has an entrance, a first opening, and a second opening. One end of the mounting piece near the entrance is coupled to the fixed case, and another end is connected to the fixed case with the flexible structure. The mounting piece has a guide flange with a contact surface disposed corresponding to the first opening. When the electronic device is contacting the contact surface, the mounting piece is lifted up until the guide flange mounted on the first mounting hole. The mounting piece further has a mounting flange disposed corresponding to the second opening to be mounted with the second mounting hole.

18 Claims, 7 Drawing Sheets

ELECTRONIC DEVICE RETENTION APPARATUS

RELATED APPLICATIONS

This application claims priority to Taiwan Application Serial Number 95114780, filed Apr. 25, 2006, which is herein incorporated by reference.

BACKGROUND

1. Field of Invention

The present invention relates to a retention apparatus. More particularly, the present invention relates to electronic device retention apparatus to assemble a computer.

2. Description of Related Art

With the rapid development in information technology, computers and their peripherals have become very popular. Multiple peripheral device types, such as compact disk drivers, floppy disk drivers, and hard disk drivers, have become fundamental computer devices. The assembling and disassembling of computers is increasingly complex and the number of peripheral devices in the computer system is increasing. Conventional retention apparatus, for example, the peripheral device, such as a compact disc driver, may be fixed on a case with multiple screws and other support tools such as a wrench. That may reduce the efficiency of the assembling and disassembling of a computer. Therefore, the conventional fixed method of using screws and a wrench is not convenient for the assembly process, and may reduce the assembly efficiency. Furthermore, screws left in the computer may cause a short circuit in the computer.

For the foregoing reasons, there is a need to redesign electronic devices retention apparatus, which enables improving the efficiency of the computer assembly and reduce the number of screws.

SUMMARY

It is therefore an objective of the present invention to provide a retention apparatus to improve the efficiency of computer assembling.

It is another objective of the present invention to provide a retention apparatus to fix and remove the electronic devices rapidly during computer assembly.

It is still another objective of the present invention to provide the retention apparatus to reduce the use of screws during computer assembly.

In accordance with the foregoing and other objectives of the present invention, an electronic device retention apparatus for fixing an electronic device with a first mounting hole and a second mounting hole. The electronic device retention apparatus includes a fixed case, a flexible structure, and a fixed piece. The fixed case includes an entrance, a first opening, and a second opening. The first opening is disposed near the entrance and is corresponding to the first mounting hole of the electronic device. The second opening is disposed further from the entrance and is corresponding to the second mounting hole of the electronic device. The mounting piece has two ends, one end is near the entrance and coupled to the fixed case, the flexible structure connects the other end to the fixed case. The mounting piece includes a guide flange disposed corresponding to the first opening, and a mounting flange disposed corresponding to the second opening wherein the mounting flange is mounted on the second hole of the electronic device to fix the electronic device on the fixed case. The guide flange has a contact surface. When the electronic device is contacting the contact surface, the mounting piece may be lifted up until the guide flange mounted on the first mounting hole. The mounting flange may be mounted in the second hole of the electronic device for fixing the electronic device on the fixed case.

The present invention provides an electronic device retention apparatus for vertically fixing a plurality of electronic devices. Each of the electronic devices has a first mounting hole and a second mounting hole. The electronic device retention apparatus includes a fixed case, a flexible structure, and a fixed piece. The fixed case includes an entrance, a plurality of first openings, and a plurality of second openings. The first openings are disposed near the entrance and are corresponding to the first mounting holes of the electronic devices. The second openings are disposed further from the entrance and are corresponding to the second mounting holes on the electronic devices. The mounting piece has two ends; one end near the entrance is coupled to the fixed case, the other end is connected to the fixed case with the flexible structure. The mounting piece includes a plurality of guide flanges and a plurality of mounting flanges. The guide flanges are disposed corresponding to the first opening and each of the guide flanges has a contact surface. When the electronic devices are contacting the contact surfaces, the mounting piece may be lifted up until the guide flanges mounted on the first mounting holes. The mounting flanges are disposed corresponding to the second openings. The mounting flanges may be mounted on the second hole of the electronic devices to fix the electronic devices on the fixed case.

The invention allows improving the efficiency of computer assembly. Moreover, the invention allows reducing the use of screws and may assemble a computer more rapidly.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
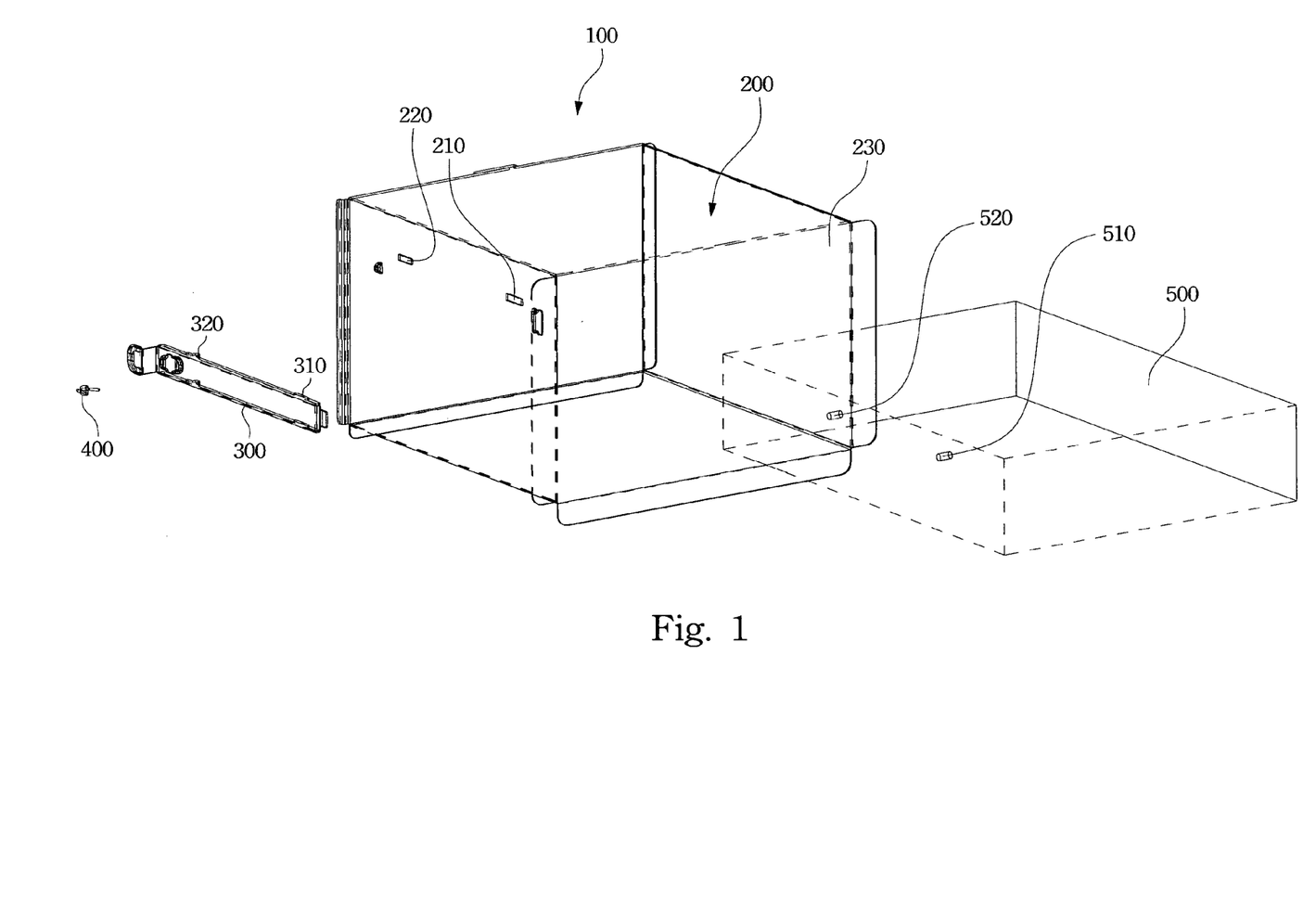
FIG. 1 illustrates an exploded view of an embodiment of an electronic device retention apparatus.

FIG. 1 illustrates an exploded view of an embodiment of an electronic device retention apparatus. An electronic device retention apparatus 100 includes a fixed case 200, a mounting piece 300, a flexible structure 400, and an electronic device 500. The fixed case 200 has a first opening 210 disposed near to an entrance 230 of the fixed case 200, and a second opening 220 referring to the first opening 210 may be disposed further from the entrance 230 of the fixed case 200. One end of the mounting piece 300 near the entrance 230 is coupled to the fixed case 200, and the other end is connected with the fixed case 200 with the flexible structure 400. The mounting piece 300 has a guide flange 310 disposed corresponding to the first opening 210. The mounting piece 300 further has a mounting flange 320 disposed corresponding to the second opening 220. The electronic device 500 has a first mounting hole 510 disposed corresponding to the first opening 210, and a second mounting hole 520 corresponding to the second opening 220.

Figure 2A:
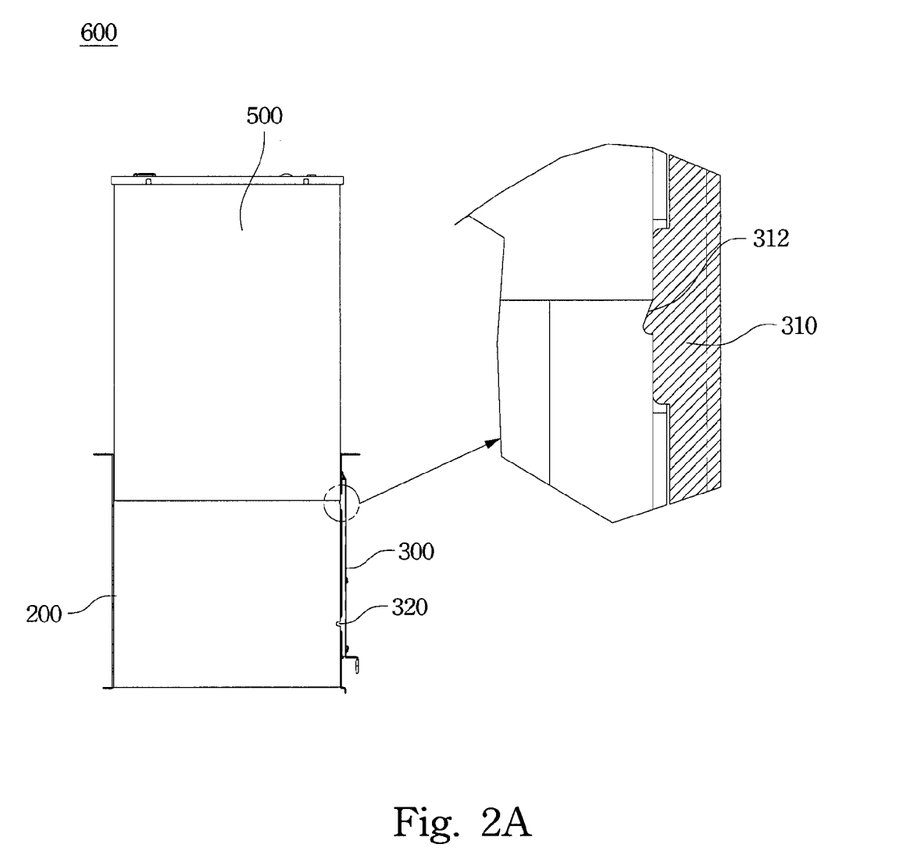
FIG. 2A to FIG. 2C illustrates different using schematic diagrams of the embodiment of the electronic device retention apparatus; and FIG. 3 to FIG. 5 illustrates exploded views of different embodiments of the electronic device retention apparatus.
Figure 2B:
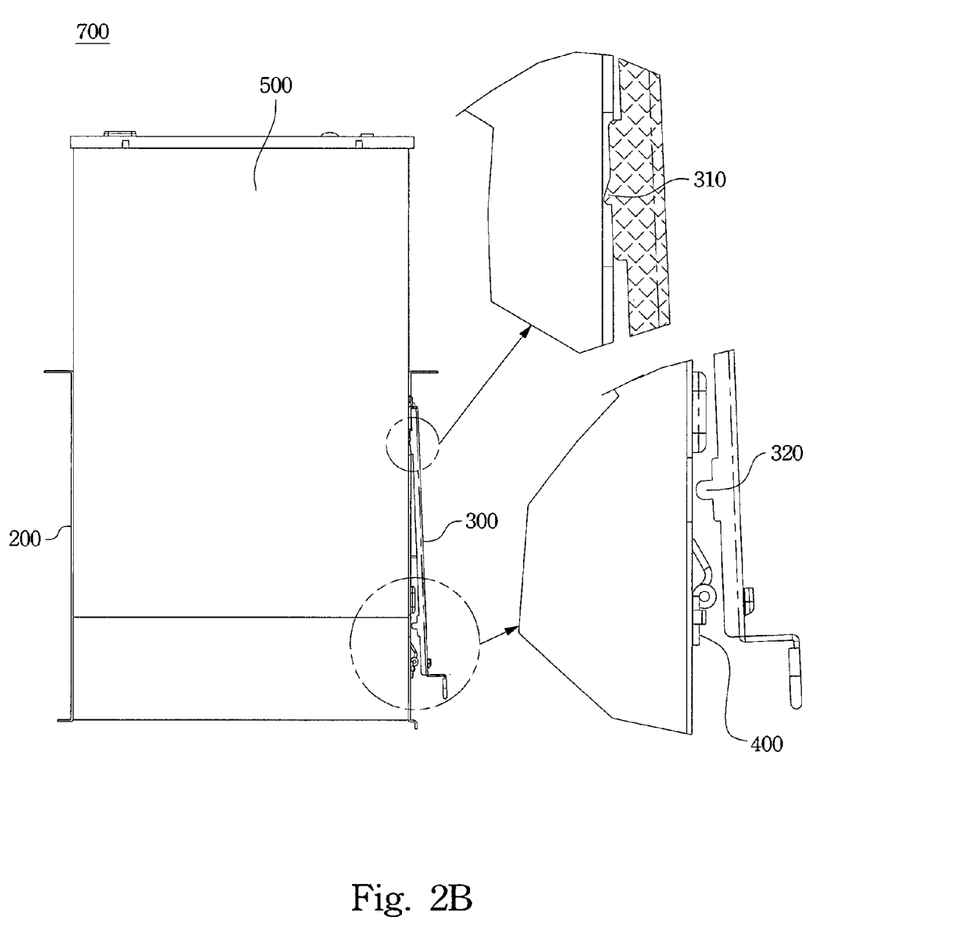
Figure 2C:
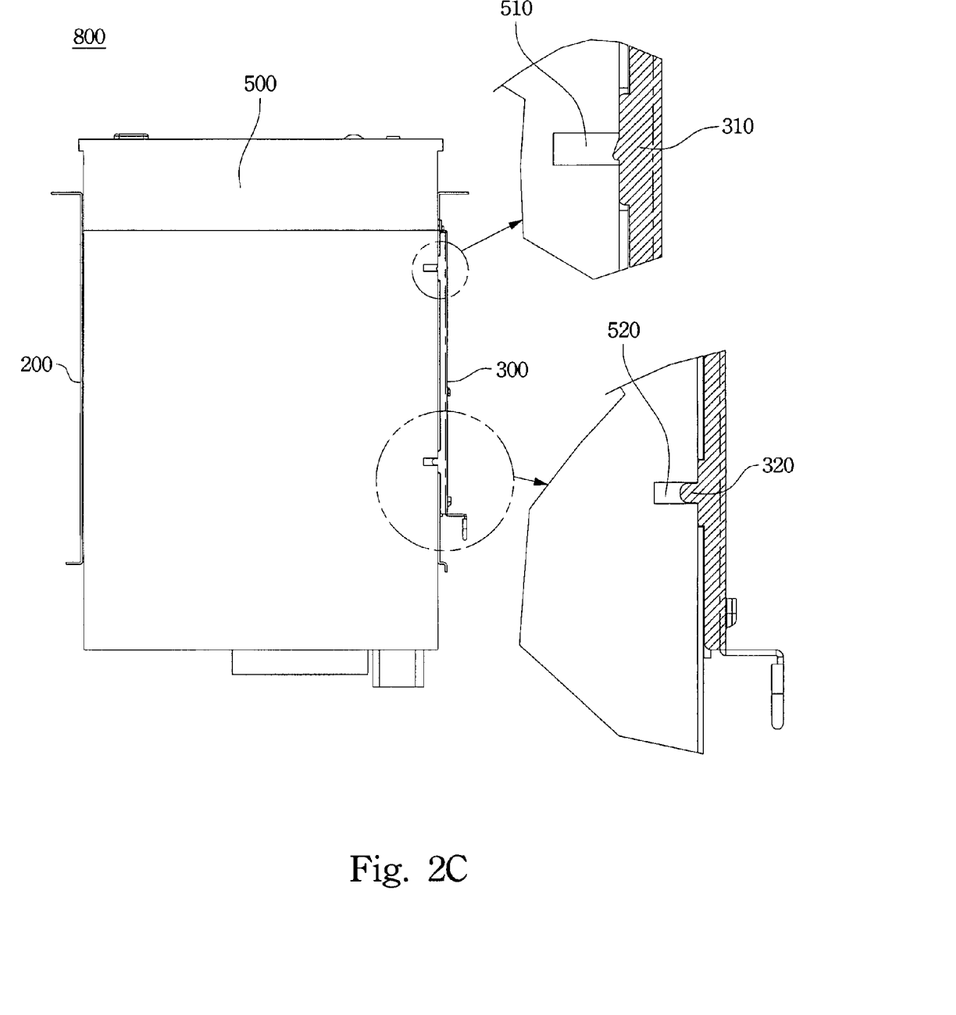

FIG. 2A to FIG. 2C illustrates different schematic diagrams of the embodiment of the electronic device retention apparatus. In state 600 in FIG. 2A is shown, the guide flange 310 further has a contact surface 312. The electronic device 500 may enter the fixed case 200, and the contact surface 312 of the guide flange 310 may be an incline plane, and when the electronic device 500 contacting the contact surface 312, the mounting piece 300 may be lifted up and be installed smoothly. In state 700 in FIG. 2B, the electronic device 500 is contacting the contact surface 312; the mounting piece 300 may be lifted up but still be connected with the fixed case 200 by the flexible structure 400, so that the electronic device 500 may continue to be installed smoothly. The flexible structure 400 may be a spring (such as a torisional spring or an expansion spring). In state 800 in FIG. 2C, the electronic device 500 is at a predefined position and the guide flange 310 of the mounting piece 300 may be mounted with the first mounting hole 510 of the electronic device 500, and the mounting flange 320 may mount the second mounting hole 520 of the electronic device 500. As a result, the electronic device 500 may be secured to the fixed case 200 with the second mounting hole 520 mounted the mounting flange 320 and the first mounting hole 510 mounted the guide flange 310.

Figure 3:
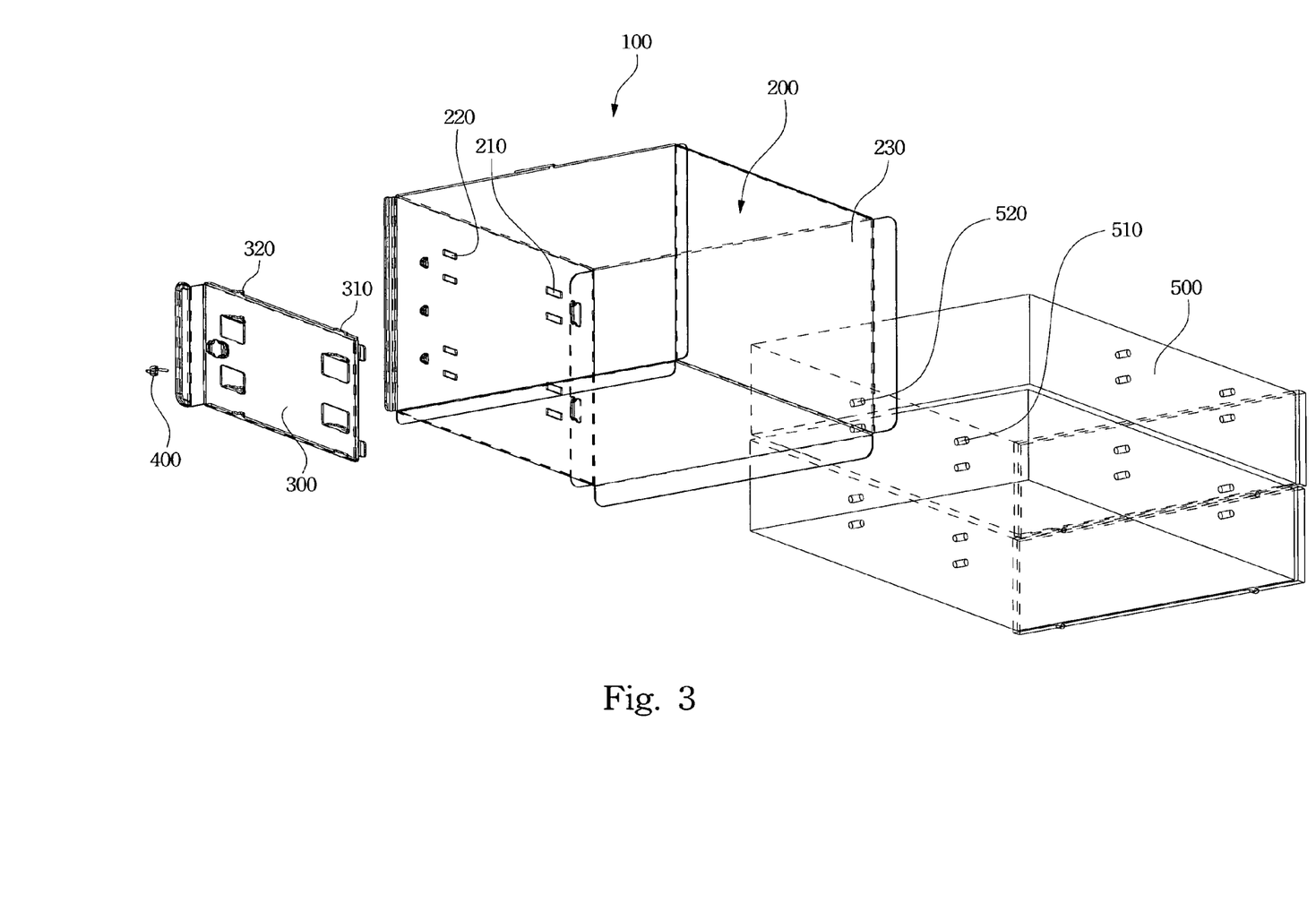

FIG. 3 illustrates an exploded view of a second embodiment of an electronic device retention apparatus. The electronic device retention apparatus 100 includes the fixed case 200, the mounting piece 300, the flexible structure 400, and a plurality of the electronic devices 500. The fixed case 200 has a plurality of the first openings 210 disposed near to the entrance 230 of the fixed case 200, and a plurality of the second openings 220 referring to the first opening 210 disposed further from the entrance 230 of the fixed case 200. One end of the mounting piece 300 near the entrance 230 may be coupled with the fixed case 200, and the other end is connected with the fixed case 200 with the flexible structure 400. The mounting piece 300 has a plurality of the guide flanges 310 disposed corresponds to the first opening 210. The mounting piece 300 further has a plurality of the mounting flanges 320 disposed corresponding to the second opening 220. Each of the electronic devices 500 has the first mounting hole 510 disposed corresponding to the first opening 210, and the second mounting hole 520 disposed corresponding to the second opening 220.

Using the second embodiment is same as shown in FIG. 2A to FIG. 2C illustrated. The mounting piece 300 has a plurality sets of the guide flanges 310 and the mounting flanges 320 in this embodiment, so that one mounting piece 300 may be utilized to fix the plurality of the electronic devices. The electronic devices 500 may be pulled into the fixed case 200 one by one, or may be all pulled into the electronic device 500 all at once.

Figure 4:
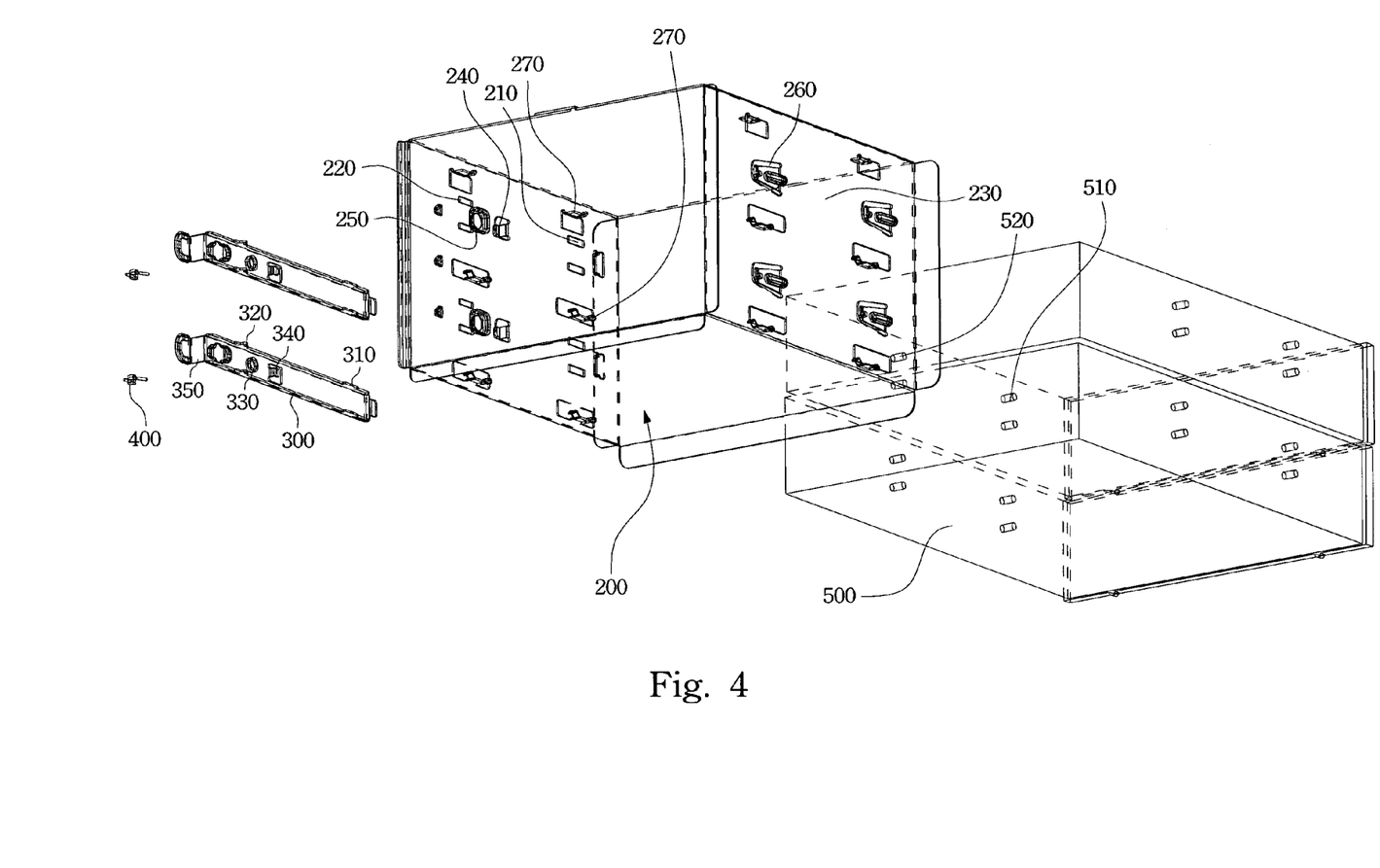

FIG. 4 illustrates an exploded view of a third embodiment of an electronic device retention apparatus. The mounting pieces 300 may be utilized to one to one fix the electronic devices 500. The fixed case 200 further includes a plurality of pressurized structures 260 disposed on the side opposite to the mounting pieces 300 of the fixed case 200 to provide pressure on the side of the electronic devices 500 to reduce a horizontal deviation of the electronic devices 500. The fixed case 200 further includes the guide pieces 270 disposed on the fixed case 200 to vertically fix the electronic devices 500 on the fixed case 200. The flexible structure 400 may be the spring (such as a torisional spring or a expansion spring). The fixed case 200 further includes a plurality of first hooks 240, and each of the mounting pieces 300 further includes a second hook 340 disposed corresponding to the first hooks 240. The fixed case 200 further includes a plurality of hollow parts 250, and each of the mounting pieces 300 further includes a raised part 330 disposed corresponding to the hollow parts 250. The hollow parts 250 are mounted on the raised parts 330 to further fix the mounting piece 300 on the fixed case 200.

Figure 5:
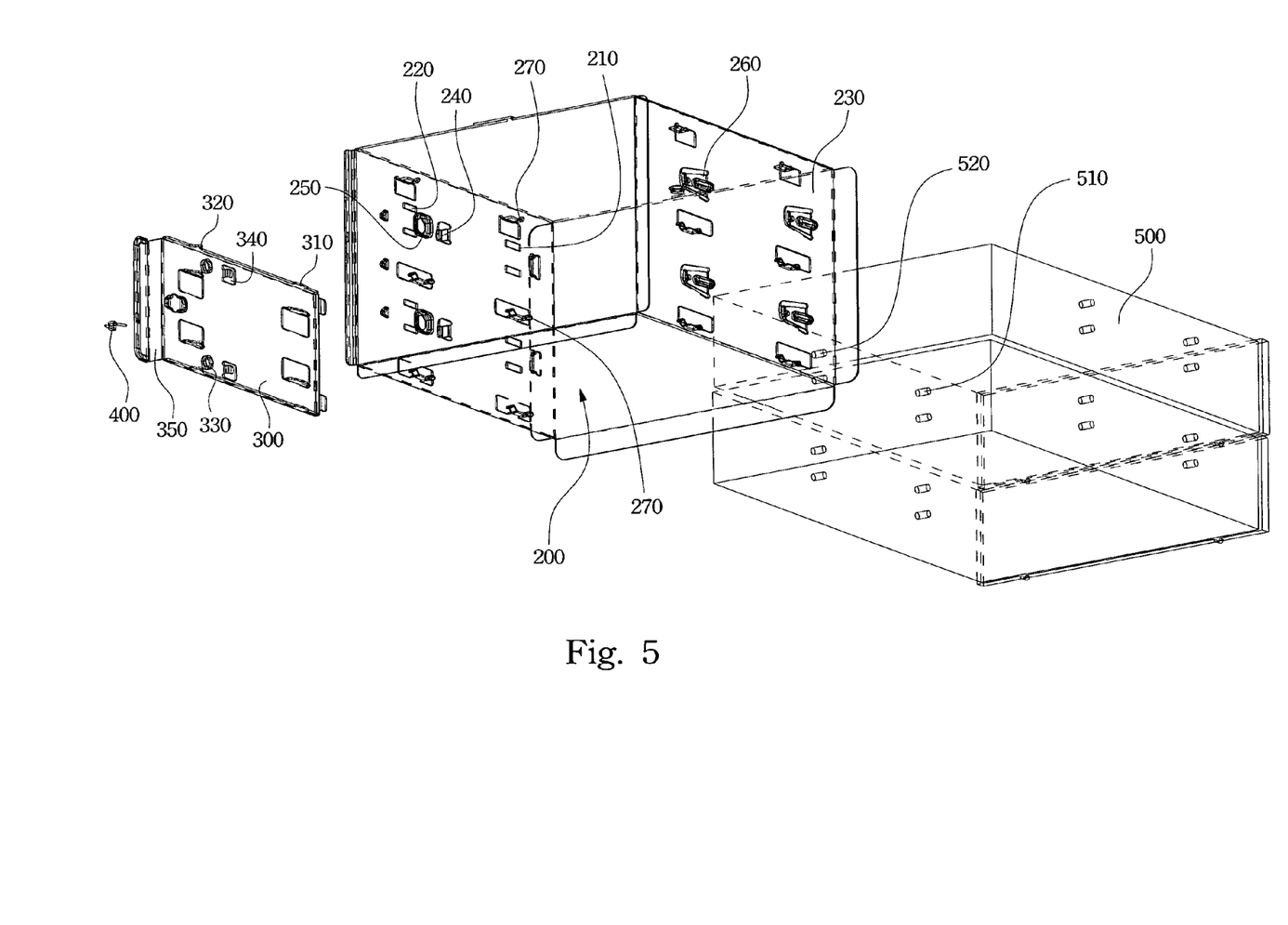

FIG. 5 illustrates an exploded view of a fourth embodiment of an electronic device retention apparatus. The mounting piece 300 may be used to fix the plurality of electronic devices 500 on the fixed case 200. The fixed case 200 further includes the plurality of pressurized structures 260 disposed on the side opposite to the mounting piece 300 of the fixed case 200 to provide side pressure on the electronic devices 500 to reduce the horizontal deviation of the electronic devices 500. The fixed case 200 further includes the guide pieces 270 disposed on the fixed case 200 to further vertically fix the electronic devices 500 on the fixed case 200. The flexible structure 400 may be the spring (such as a torisional spring or a expansion spring). The fixed case 200 further includes a plurality of the first hooks 240, and the mounting piece 300 further includes a plurality of the second hooks 340 disposed corresponding to the first hooks 240. The fixed case 200 further includes a plurality of the hollow parts 250, and the mounting piece 300 further includes a plurality of the raised parts 330 disposed corresponding to the hollow parts 250. The hollow parts 250 may be mounted on the raised parts 330 to further fix the mounting piece 300 on the fixed case 200.

Referring to FIG. 4 and FIG. 5, the mounting piece 300 further has a puller 350 disposed on the mounting piece 300 and connected to the flexible structure 400. The guide flange 310 and the mounting flange 320 of the mounting piece 300 may be disconnected from the first mounting hole 510 and the second mounting hole 520 of the electronic device 500 to remove the electronic device 500 from the fixed case 200 by pulling the puller 350. There is a space between the first hook 240 of the fixed case 200 and the second hook 340 of the mounting piece 300 to limit the pivoting range of the mounting piece 300 and prevent the mounting piece 300 disconnecting from the fixed case 200.

From the description above, a number of advantages of the invention of the electronic device become evident: The efficiency of the computer assembly is substantially improved with the use of the invention. The electronic device may rapidly be assembled without any screws.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device retention apparatus to fix an electronic device with a first mounting hole and a second mounting hole, comprising:

a fixed case comprising:

an entrance;
   a first opening disposed near the entrance and corresponding to the first mounting hole of the electronic device; and
   a second opening disposed further from the entrance and corresponding to the second mounting hole of the electronic device;
a flexible structure; and
a mounting piece with two ends, one end near the entrance coupled with the fixed case, the other end connected to the fixed case with the flexible structure, wherein the mounting piece comprises:
   a guide flange disposed corresponding to the first opening, the guide flange having a contact surface, and when the electronic device contacting the contact surface, the mounting piece being lifted up until the guide flange mounted on the first mounting hole; and
   a mounting flange disposed corresponding to the second opening wherein the mounting flange is mounted on the second hole of the electronic device to fix the electronic device on the fixed case.

2. The electronic device retention apparatus of claim 1, wherein the contact surface is an incline plane, and when the electronic device contacting the contact surface, the mounting piece being lifted up.

3. The electronic device retention apparatus of claim 1, wherein the fixed case further comprises a pressurized structure disposed on the side opposite to the mounting piece of the fixed case for providing pressure on the side of the electronic device.

4. The electronic device retention apparatus of claim 1, wherein the fixed case further comprises a guide piece disposed on the fixed case to vertically fix the electronic device.

5. The electronic device retention apparatus of claim 1, wherein the flexible structure is a torisional spring or an expansion spring.

6. The electronic device retention apparatus of claim 1, wherein the fixed case further comprises a hollow part, the mounting piece further comprises a raised part disposed corresponding to the hollow part, wherein the hollow part is mounted on the raised part for further fixing the mounting piece on the fixed case.

7. The electronic device retention apparatus of claim 1, wherein the electronic device is a compact disc driver, a floppy disc driver, or a hard disc driver.

8. The electronic device retention apparatus of claim 1, wherein the fixed piece further comprises a puller disposed on the side of the mounting piece connected with the fixed case, wherein the guide flange and the mounting flange departed from the first mounting hole and the second mounting hole to remove the electronic device when pulling the puller.

9. The electronic device retention apparatus of claim 8, wherein the fixed case further comprises a first hook, the mounting piece further comprises a second hook disposed corresponding to the first hook, and a space between the first hook and the second hook, wherein the first hook touches the second hook to prevent the mounting piece disconnecting from the fixed case by pulling the puller.

10. An electronic device retention apparatus to vertically fix a plurality of electronic devices, each of the electronic devices has a first mounting hole and a second mounting hole, the electronic device retention apparatus comprising:
a fixed case, comprising:
   an entrance;
   a plurality of first openings disposed near the entrance and corresponding to the first mounting holes of the electronic devices; and
   a plurality of second openings disposed further from the entrance and corresponding to the second mounting holes of the electronic devices;
a flexible structure; and
a mounting piece with two ends, one end near the entrance coupled to the fixed case, the other end connected with the fixed case with the flexible structure; wherein the mounting piece comprising:
   a plurality of guide flanges disposed corresponding to the first openings, each of the guide flanges has a contact surface, and when the electronic devices contacting the contact surfaces, the mounting piece being lifted up until the guide flanges mounted on the first mounting holes; and
   a plurality of mounting flanges disposed corresponding to the second openings wherein the mounting flanges are mounted on the second hole of the electronic devices to fix the electronic devices on the fixed case.

11. The electronic device retention apparatus of claim 10, wherein each of the contact surfaces is an incline plane, and when the electronic devices contacting the contact surfaces, the mounting piece being lifted up.

12. The electronic device retention apparatus of claim 10, wherein the fixed case further comprises a plurality of pressurized structures disposed on the side opposite to the mounting piece of the fixed case to provide side pressure on the electronic devices.

13. The electronic device retention apparatus of claim 10, wherein the fixed case further comprises a plurality of guide pieces disposed on the fixed case to vertically fix the electronic devices.

14. The electronic device retention apparatus of claim 10, wherein the flexible structure is a torisional spring or an expansion spring.

15. The electronic device retention apparatus of claim 10, wherein the fixed case further comprises a hollow part, the mounting piece further comprises a raised part disposed corresponding to the hollow part, wherein the hollow part mounted on the raised part to further fix the mounting piece on the fixed case.

16. The electronic device retention apparatus of claim 10, wherein the plurality of electronic devices is a plurality of compact disc drivers, a plurality of floppy disc drivers, or a plurality of hard disc drivers.

17. The electronic device retention apparatus of claim 10, wherein the fixed piece further comprises a puller disposed on the side of the mounting piece connected to the fixed case, wherein the guide flanges and the mounting flanges disconnect from the first mounting holes and the second mounting holes to remove the electronic devices by pulling the puller.

18. The electronic device retention apparatus of claim 17, wherein the fixed case further comprises a first hook, the mounting piece further comprises a second hook disposed corresponding to the first hook, and a space between the first hook and the second hook, wherein the first hook is in contact with the second hook to prevent the mounting piece from disconnecting from the fixed case when pulling the puller.

* * * * *